(12) United States Patent
Chou

(10) Patent No.: US 7,244,054 B2
(45) Date of Patent: Jul. 17, 2007

(54) DIRECTION INDICATION LIGHT INSTALLED ON A HANDLE OF A CAR DOOR

(76) Inventor: Po Hung Chou, 235 Chung - Ho Box 8-24, Taipei (TW)

( * ) Notice: Subject to any disclaimer, the term of this patent is extended or adjusted under 35 U.S.C. 154(b) by 87 days.

(21) Appl. No.: 11/141,132

(22) Filed: Jun. 1, 2005

(65) Prior Publication Data

US 2006/0274539 A1 Dec. 7, 2006

(51) Int. Cl.
*B60Q 1/26* (2006.01)
(52) U.S. Cl. .............................. 362/501; 362/545
(58) Field of Classification Search ............... 362/501, 362/85, 545; 340/471, 463
See application file for complete search history.

(56) References Cited

U.S. PATENT DOCUMENTS

| | | | | |
|---|---|---|---|---|
| 6,382,819 B1 * | 5/2002 | McQuiston | ................. | 362/495 |
| 6,461,028 B1 * | 10/2002 | Huang | ........................ | 362/505 |
| 6,854,870 B2 * | 2/2005 | Huizenga | .................... | 362/501 |
| 2003/0147253 A1 * | 8/2003 | Shy | ............................. | 362/545 |
| 2004/0233677 A1 * | 11/2004 | Sue et al. | ................... | 362/501 |

* cited by examiner

*Primary Examiner*—Ali Alavi

(57) ABSTRACT

A direction indication light installed on a handle of a car door comprises a body; a front edge thereof installed with a receiving groove; the receiving groove received with a plurality of circuit boards, a light guide plate, and a cover; each circuit board being installed with light emitting body; upper sides of the circuit boards being installed with a light guide plate for receiving the circuit boards; the power wires of the circuit boards serve to light up the light emitting body of at least one of the circuit boards. By the indication light, the periphery of the car is lighted up so that cars at the periphery of the car can keep attention to the state of the car to prevent from collision due to weak view.

8 Claims, 4 Drawing Sheets

DIRECTION INDICATION LIGHT INSTALLED ON A HANDLE OF A CAR DOOR

FIELD OF THE INVENTION

The present invention relates to vehicles, and in particular to a direction indication light installed on a handle of a car door, wherein indicating lights can be installed to the handles of the car doors so as to alert the cars or people at the lateral outsides of the car to keep attention to the vehicles and thus to increase the security in driving.

BACKGROUND OF THE INVENTION

In the prior art vehicles, indication lights are installed at the front and rear sides of the vehicles. They only alert the cars or people coming from the front and rear sides of the vehicles. However no light is installed at the two lateral sides of the vehicles. In many cases, the accidents are induced from the collisions at the lateral sides, for example when the vehicles run across a crossroad. Thereby there is an eager demand for a novel design which can improve the prior art defects.

SUMMARY OF THE INVENTION

Accordingly, the primary object of the present invention is to provide a direction indication light installed on a handle of a car door which comprises a body; a front edge thereof installed with a receiving groove; the receiving groove received with a plurality of circuit boards, a light guide plate, and a cover; each circuit board being installed with light emitting body; each of the circuit boards being extended with a respective power wire which can be received in a wire guiding trench; the wires being installed along the wire guiding trench to pass through the hole of the receiving groove so that the wires extends out of the body; upper sides of the circuit boards being installed with a light guide plate for receiving the circuit boards; a front end of the light guide plate being installed with the cover; the power wires of the circuit boards serve to light up the light emitting body of at least one of the circuit boards; if the direction indicating light is switched, the light emitting body at least one of the circuit boards will extinguish, and the light emitting bodies of the other circuit board light up which are flashed with the indicating light; thereby the periphery of the car is lighted up so that cars at the periphery of the car can keep attention to the state of the car to prevent from collision due to weak view.

The various objects and advantages of the present invention will be more readily understood from the following detailed description when read in conjunction with the appended drawing.

BRIEF DESCRIPTION OF THE PREFERRED EMBODIMENTS

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
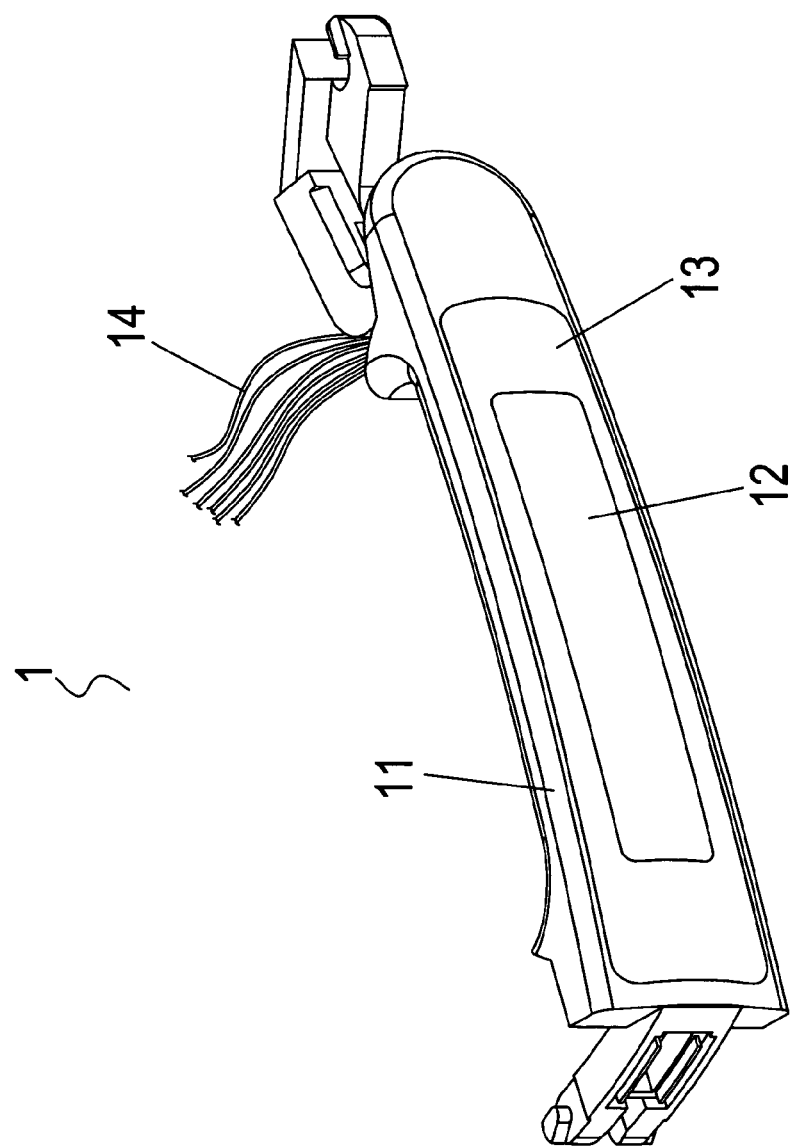
FIG. 1 is a schematic perspective view of the direction indication light installed on a handle of a car door of the present invention.
Figure 2:
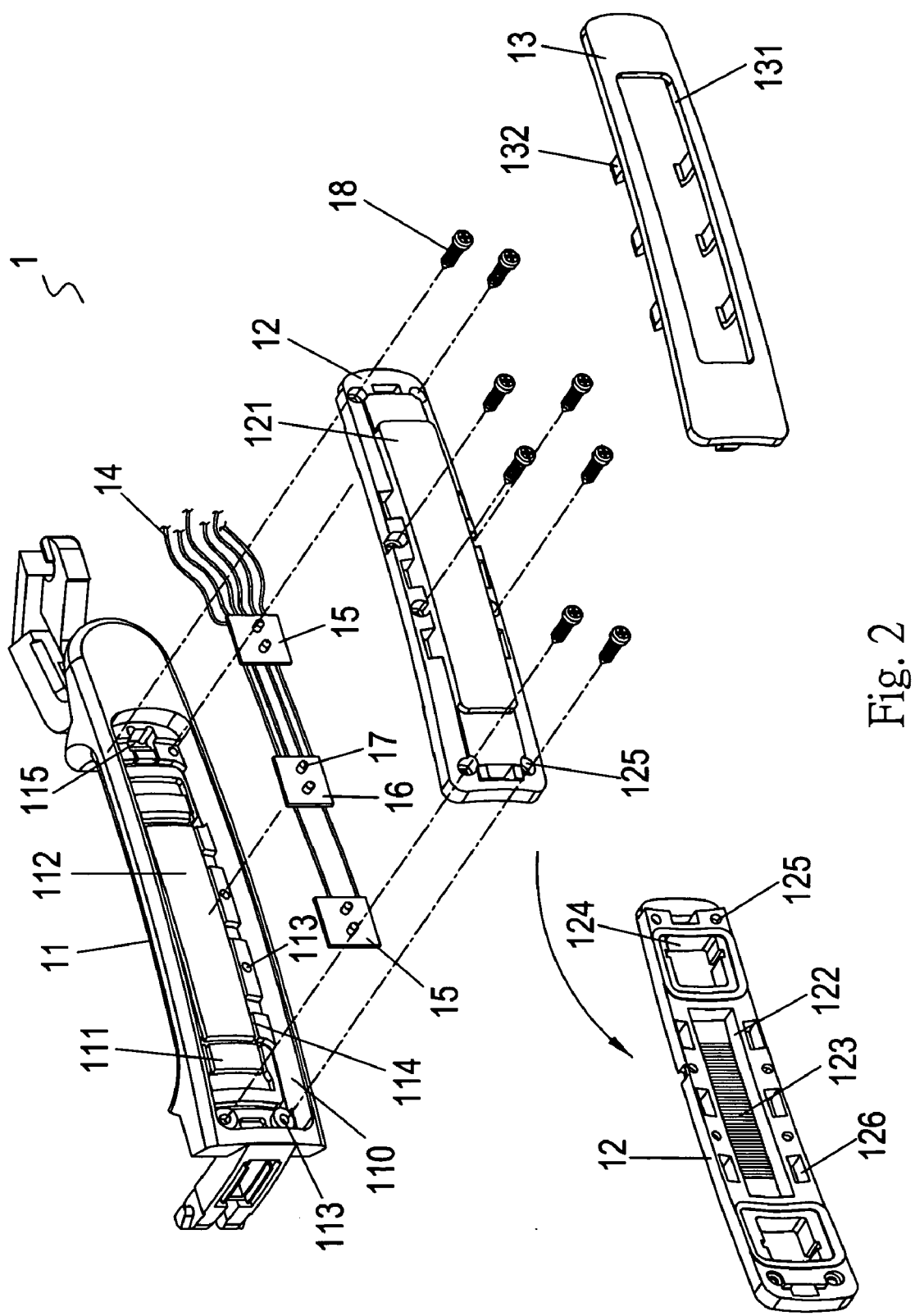
FIG. 2 is an exploded schematic view of the direction indication light installed on a handle of a car door of the present invention.

Referring to FIGS. 1 to 2, the direction indication light installed on a handle of a car door 1 is illustrated. The present invention has a body 11. A front edge thereof is installed with a receiving groove 110. The receiving groove 110 is received with an A circuit board 15, a B circuit board 16, a light guide plate 12, and a cover 13. A bottom side of receiving groove 110 is formed with a plurality of screw holes 113, a wire guiding trench 114 and a hole 115. A center of the receiving groove 110 is installed with a B platform 112. An end surface of the B platform 112 is adhered with a B circuit board 16. Two opposite sides of the B platform 112 are installed with respective A platform 111. Each A platform 111 is adhered with a respective A circuit board 15. Each A circuit board 15 is installed with a light emitting body 17. Each of the A circuit boards 15 and the B circuit board 16 are extended with a respective power wire 14 which can be received in the wire guiding trench 114. The wires 14 can be installed along the wire guiding trench 114 to pass through the hole 115 in bottom side of the receiving groove 110 so that the wires 14 extend out of the body 11.

Upper sides of the A circuit boards 15 and B circuit board 16 are installed with a light guide plate 12. An outer side of the light guide plate 12 is protruded with a protruding seat 121 and via holes 126. A periphery of the light guide plate 12 is formed with a plurality of screw holes 125. An inner side of the protruding seat 121 is formed with a receiving chamber 122 and each of two sides of the receiving chamber 122 is formed with a recess 124. The receiving chamber 122 serves to receive the B circuit board 16 and the recesses 124 serve to receive the A circuit boards 15. A light guide layer 123 is installed in the receiving chamber 122 so that a little light will make the light guide plate 12 light up sufficiently. The screw holes 125 of the light guide plate 12 can be steadily locked to the screw holes 113 of the body 11 so that the light guide plate 12 is assembled to the body 11. A front end of the light guide plate 12 is installed with the cover 13. A strip like via hole 131 is formed on the cover 13. A plurality of hooks 132 are installed on the cover 13. The hooks 132 are able to penetrate through the via holes 126 to hook the end surface of the light guide plate 12. The strip like via hole 131 in the cover 13 serves to receive the protruding seat 121 of the light guide plate 12 so that the outer surface of the protruding seat 121 is flushed with the outer surface of the cover 13. The power wires 14 of the A circuit boards 15 and B circuit board 16 are connected to an IC control device in the car which serve to light up the light emitting body 17 of the B circuit board 16. If the direction indicating light is switched, the light emitting body 17 will extinguish automatically, and the light emitting bodies 17 of the A circuit board 15 will light up which are flashed with the indicating light. Thereby the periphery of the car is lighted up so that cars at the periphery of the car can keep attention to the state of the car to prevent from collision due to weak view.

Figure 3:
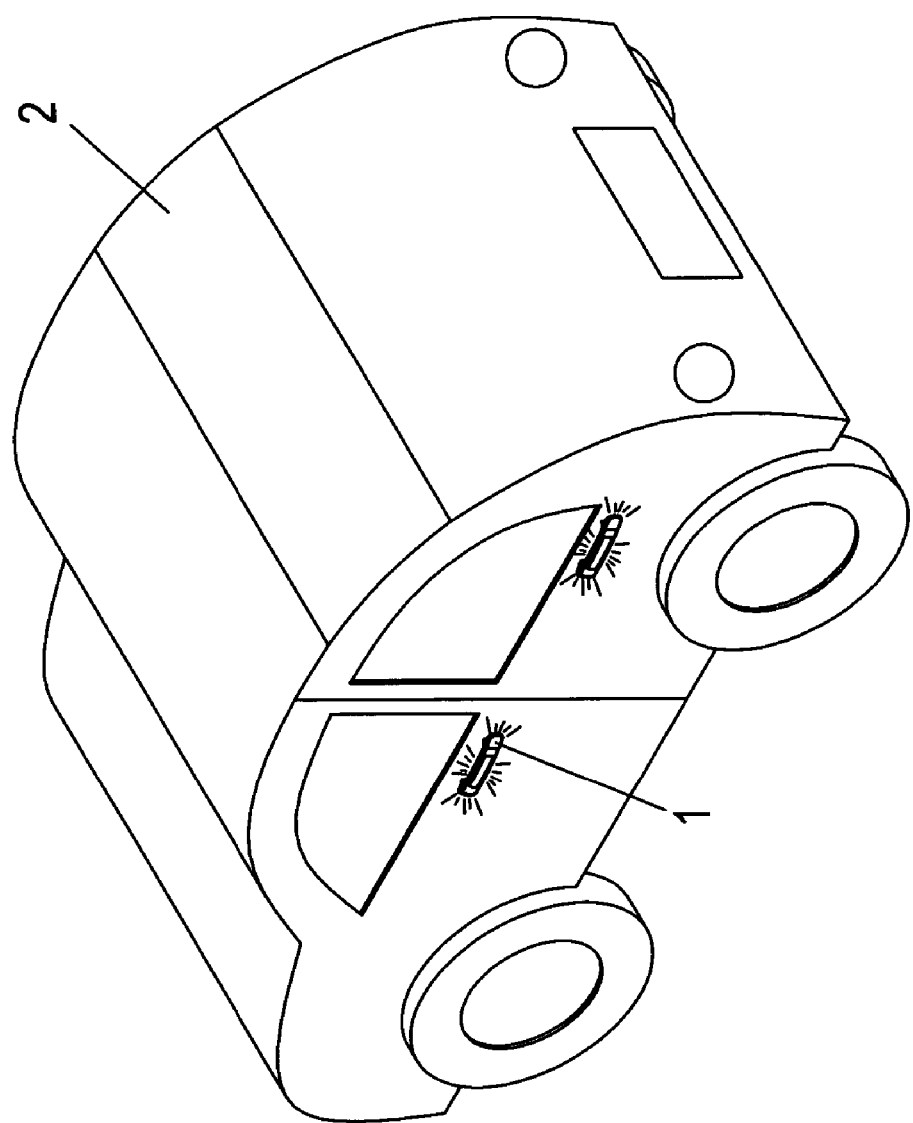
FIG. 3 is a schematic view about the first embodiment of the present invention.

With reference to FIG. 3, one embodiment of the present invention is illustrated. The two sides of the handle of the car door are installed with the directional indicating lights 1. When the lights are switched, the A circuit boards 15 will light up. When the driver actuates the far field light of the car 2, the light emitting body 17 of the B circuit board 16 will light up and the light emitting bodies 17 of the A circuit boards 15 extinguish. The periphery of the car has sufficient light so as to prevent from collision.

Figure 4:
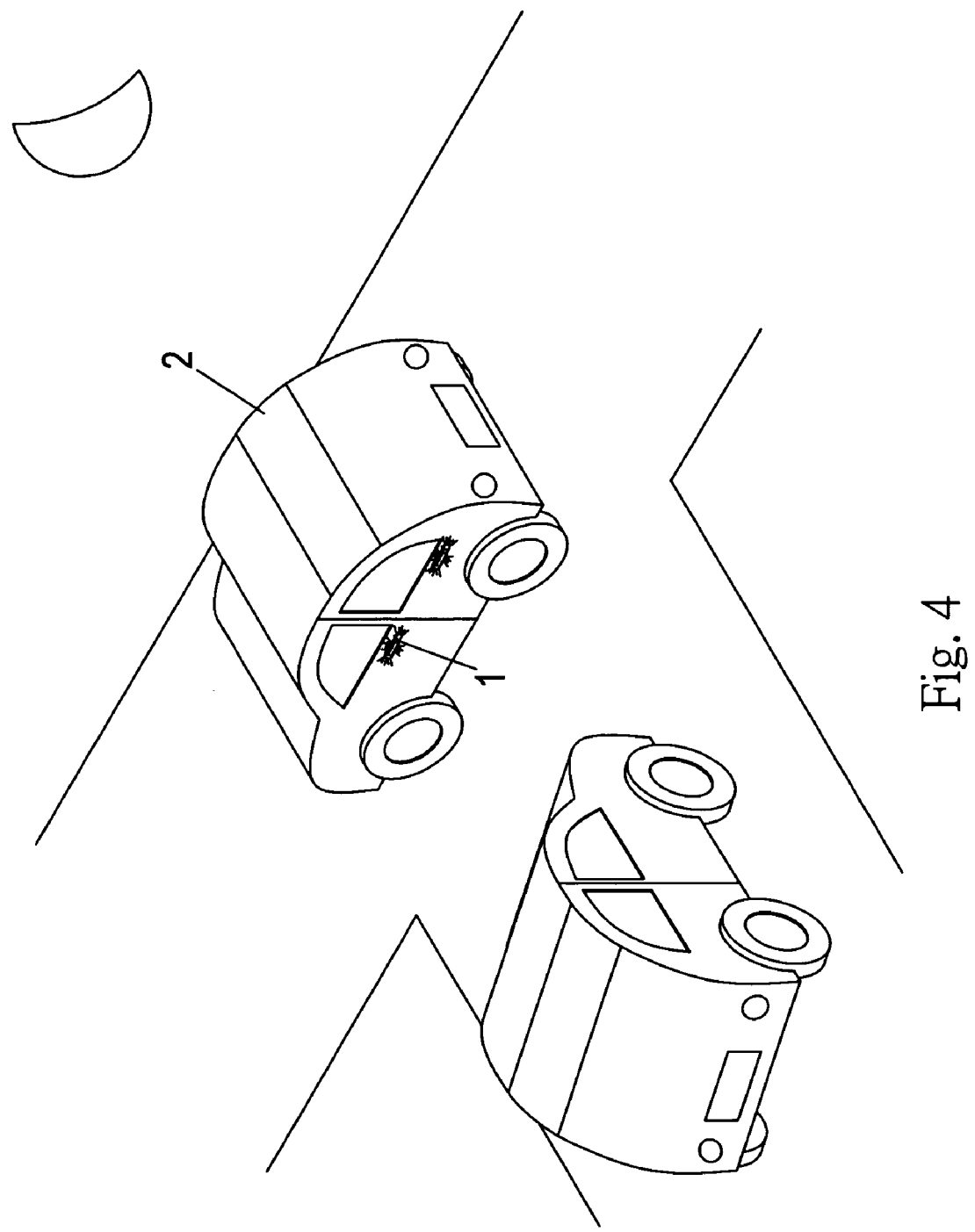
FIG. 4 is a schematic view about another embodiment of the present invention.

Referring to FIG. 4, the second embodiment of the present invention will be described. When a car passes through a crossroad, it will keep the attention of the peoples and other cars so as to have a security driving.

The outer surface of the cover and the outer surface of the cover have streamline shapes.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A direction indication light installed on a handle of a car door comprising:

a body; a front edge thereof installed with a receiving groove; the receiving groove received with three circuit boards, a light guide plate, and a cover; each circuit board being installed with light emitting body; each of the circuit boards being extended with a respective power wire which can be received in a wire guiding trench; the wires being installed along the wire guiding trench to pass through the hole of the receiving groove so that the wires extends out of the body;

a light guide plate being installed at upper sides of the circuit boards for receiving the circuit boards;

a cover installed at a front end of the light guide plate; the power wires of the circuit boards for lighting up the light emitting body of at least one of the circuit boards; if the direction indicating light is switched, the light emitting body of at least one of the circuit boards will extinguish, and the light emitting bodies of the other circuit board light up which are flashed with the indicating light; thereby the periphery of the car is lighted up so that cars at the periphery of the car can keep attention to the state of the car to prevent from collision due to weak view;

wherein a strip like via hole is formed on the cover; a plurality of hooks are installed on the cover; the hooks penetrates through the via holes to hook the end surface of the light guide plate; the strip like via hole in the cover receives the protruding seat of the light guide plate so that the outer surface of the protruding seat is flushed with the outer surface of the cover;

wherein the receiving groove is installed with a B platform; an end surface of the B platform is adhered with a B circuit board; two opposite sides of the B platform are installed with respective A platform; each A platform is adhered with a respective A circuit board; wherein the two A platform is separated from the B platform and there are only three platforms for receiving all the circuit boards;

wherein an outside of the light guide plate is protruded with a protruding seat and via holes; a periphery of the light guide plate are formed with a plurality of screw holes; and wherein an inner side of the protruding seat is formed with a receiving chamber and each of two sides of the receiving chamber are formed with a recess; the receiving chamber serves to receive the B circuit board and the recesses serve to receive the A circuit boards; wherein a size of the receiving chamber is greater than a size of each of the recess; each of the receiving chamber and the recesses has an approximately rectangular shape; and all the light emitting bodies is received in the two recesses and the receiving chamber.

2. The direction indication light installed on a handle of a car door as claimed in claim 1, wherein the receiving groove is formed with a plurality of screw holes, a wire guiding trench and a hole.

3. The direction indication light installed on a handle of a car door as claimed in claim 1, wherein a light guide layer is installed in the receiving chamber so that a little light will make the light guide plate light up sufficiently.

4. The direction indication light installed on a handle of a car door as claimed in claim 1, wherein screw holes of the light guide plate are locked to the screw holes of the body so that the light guide plate is assembled to the body.

5. The direction indication light installed on a handle of a car door as claimed in claim 1, wherein a strip like via hole in the cover serves to receive the protruding seat of the light guide plate so that the outer surface of the protruding seat is protruded from the outer surface of the cover.

6. The direction indication light installed on a handle of a car door as claimed in claim 1, wherein an outer surface of the cover and an outer surface of the cover have streamline shapes.

7. The direction indication light installed on a handle of a car door as claimed in claim 1, wherein the positions of the circuit boards are changeable.

8. The direction indication light installed on a handle of a car door as claimed in claim 1, wherein the light emitting bodies of the circuit boards are different or identical.

* * * * *